H. W. HIZINGTON.
COMBINED INTAKE AND EXHAUST MANIFOLD.
APPLICATION FILED JAN. 6, 1916.
1,205,540.
Patented Nov. 21, 1916.
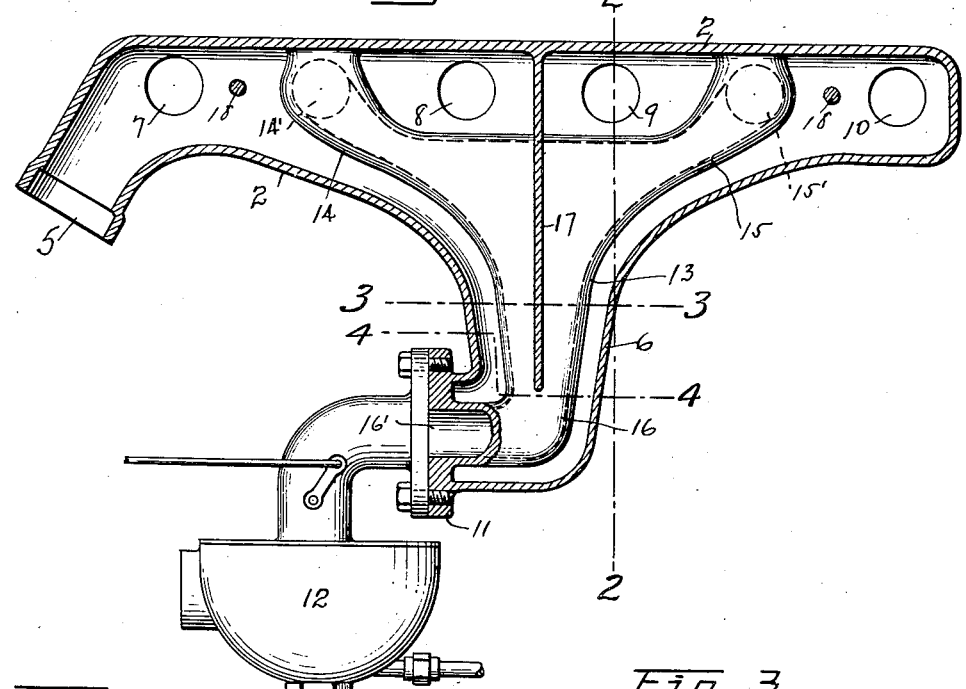
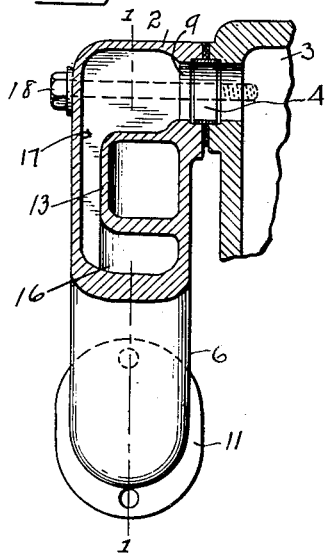
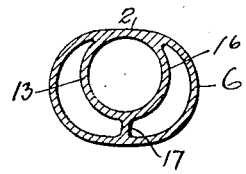
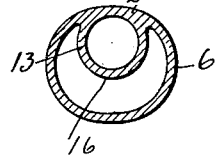
WITNESS
AC Thomas
INVENTOR.
Harry W. Hizington
BY Harry De Wallace
ATTORNEY.

UNITED STATES PATENT OFFICE.

HARRY W. HIZINGTON, OF EAST SYRACUSE, NEW YORK, ASSIGNOR OF TWO-THIRDS TO OREY W. CRANDALL, OF EAST SYRACUSE, NEW YORK, AND ROBERT A. ALDRIDGE, OF SYRACUSE, NEW YORK.

COMBINED INTAKE AND EXHAUST MANIFOLD.

1,205,540.     Specification of Letters Patent.     Patented Nov. 21, 1916.

Application filed January 6, 1916. Serial No. 70,697.

*To all whom it may concern:*

Be it known that I, HARRY W. HIZINGTON, a citizen of the United States, residing at East Syracuse, R. F. D. No. 1, in the county of Onondaga and State of New York, have invented certain new and useful Improvements in Combined Intake and Exhaust Manifolds, of which the following is a specification.

This invention relates to improvements in intake and exhaust manifolds for internal combustion engines, and the invention relates particularly to a combination of said manifolds for producing a unitary part.

The object of the invention is to provide novel, simple and effective means for heating the explosive gas as it passes from the carbureter, through the intake manifold, to the engine cylinders, for the purpose of increasing and perfecting the vaporization of the said gas, thereby improving the efficiency of the engine.

A further object is to provide a relatively large hollow body comprising the exhaust manifold, and disposing within said body a second hollow body comprising the intake manifold. And in carrying out the said construction, both of said bodies are preferably cast as a single part, each having its own inlet and outlet parts.

A further object is to generally simplify, cheapen and improve the construction of the intake and exhaust parts, as well as to increase the efficiency and regularity of the explosive charges.

I attain these objects by the means set forth in the detailed description which follows, and as illustrated in the drawing, in which—

Figure 1 is a central vertical longitudinal section substantially on line 1—1 of Fig. 2, the intake manifold being in elevation. Fig. 2 is a vertical cross-section, taken on line 2—2 of Fig. 1; showing the combined manifold applied to an engine. Fig. 3 is a horizontal section taken on line 3—3 of Fig. 1; showing the interior of the exhaust manifold divided by a partition or baffle. Fig. 4 is a similar section taken on line 4—4 of Fig. 1.

In the drawing, 2 represents the outer shell or body, which constitutes the exhaust manifold, so-called, and which may be connected to the cylinders of an engine 3, in the usual manner. In Fig. 3 I have shown at 4, one of the exhaust parts communicating with the engine cylinder 3. The top portion of the manifold 2 is elongated sufficiently to connect with the several cylinders of the engine, and at one end it terminates in an outlet nozzle 5, to which the usual pipes for conducting the exhaust may be connected. From the middle of the body 2 depends a funnel-shaped neck or portion 6. The body 2 is preferably hollow throughout, and at intervals near its top edge are disposed ports, as 7, 8, 9 and 10 for receiving the burnt gases from the several cylinders of the engine after each explosion. The extreme lower extremity of the neck 6 is flanged at 11, for attachment to a carbureter 12. All of the burnt gases which enter the manifold 2 finally exhaust through the nozzle 5, there being no other means of escape.

13 represents the intake manifold, comprising a hollow substantially V-shaped body, which is disposed within the body 2, and is preferably joined to or cast with the rear inner wall of the body 2, as best seen in Figs. 2, 3 and 4. By thus disposing the intake manifold there is provided a substantially clear space between the front side of the intake body and the corresponding wall of the exhaust body 2, so as to allow the hot burnt gases from certain of the exhaust ports, particularly 8, 9 and 10 to flow over or envelop the intake body 13, on their way to the nozzle 5. The intake body has two arms 14 and 15 which extend in opposite directions from the middle of the body 2, and in each of said arms is a port, as 14′ and 15′ which communicates with the corresponding cylinders of the engine for supplying thereto the explosive gas. The construction and arrangement of the latter parts being well understood I have not illustrated the details thereof. The intake manifold 13 also has a depending hollow neck 16 which terminates in the flange-end of the neck 6 and has a port 16′ which communicates with the carbureter 12. In order to insure the proper heating of the neck 16 of the intake manifold, and particularly the lower extremity thereof nearest the carbureter, I provide a partition 17, which is disposed vertically between the intake and exhaust manifolds, as best seen in Figs. 1 and 3. This partition extends from the top wall of the body 2 between the exhaust ports 8 and 9 downwardly to within a short distance of the bottom of the necks 6 and 16, and serves to compel the exhaust of the burnt gases from the ports 9 and 10 to flow downwardly the full length of the said partition in order to reach the nozzle 5. By this latter provision the hot gases practically envelop the lower extremity of the intake neck 16, and thereby heat the said part to about the same extent as the rest of the manifold 13 is heated. This insures the perfect and complete vaporization of the new explosive gas and greatly enhances the explosive quality and perfect combustion of the gas. The burnt gases from port 8 flow over the arm 14 of the intake body and thence directly to the port 5, while the exhaust from the port 7 does not come into contact with the intake part at all.

My improvement is extremely simple, compact and inexpensive, has but few parts, and it is capable of heating the explosive gas to such a degree that perfect vaporization is insured at all times while the engine is working. By my novel method of combining the intake and exhaust manifolds into one simple part, as herein shown and described, the heating of the gas is practically uniform and continuous, the explosions occur with greater regularity, and without any appreciable waste of fuel, which tends to heighten the efficiency of the engine.

Having thus described my invention, what I claim, is—

1. A combined intake and exhaust manifold, for internal combustion engines, comprising a hollow body adapted to receive the exhaust from an engine and having a depending neck arranged to connect to and support a carbureter, an intake manifold disposed entirely within said hollow body having a neck provided with a port communicating with the carbureter, said manifold being spaced from three of the inner sides of the said body, and a wall interposed between said manifold and one wall of said body for compelling a portion of the burned gases to flow downwardly and thence over the neck of the manifold for heating said neck.

2. The combination of an exhaust manifold comprising a hollow body having ports to receive the burned gases from an engine and having a depending neck supporting a carbureter, an intake manifold comprising a smaller hollow body inclosed within the exhaust manifold having a port to receive the explosive gas from the carbureter and ports for discharging said gas into the engine, and a wall connecting one side of the intake manifold to the corresponding side of the exhaust manifold for compelling a portion of the burned gases to flow downwardly into said neck for heating the lowermost parts of the intake manifold.

In testimony whereof I affix my signature.

HARRY W. HIZINGTON.